Figure 1:
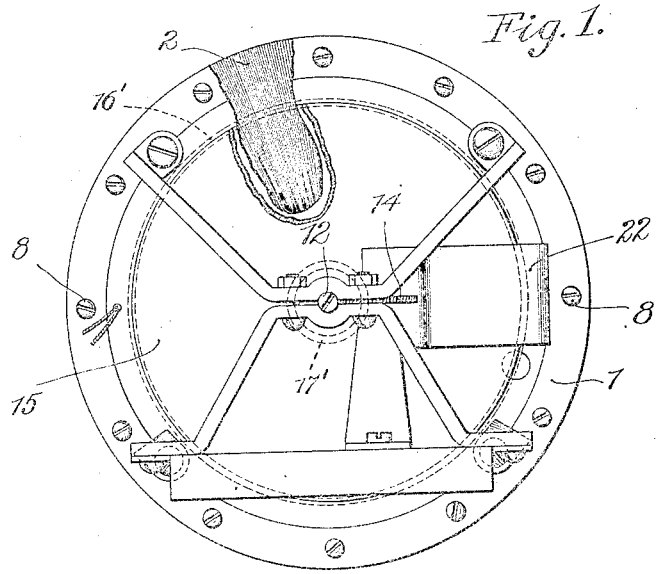

D. C. JACKSON.
ELECTRICAL MEASURING INSTRUMENT.
APPLICATION FILED JUNE 5, 1905. RENEWED JUNE 21, 1909.

929,854.

Patented Aug. 3, 1909.
2 SHEETS—SHEET 1.

Witnesses:
Leonard W. Novander
Charles J. Schmidt

Inventor
Dugald C. Jackson
By Charles A. Brown
Attorney

D. C. JACKSON.
ELECTRICAL MEASURING INSTRUMENT.
APPLICATION FILED JUNE 5, 1905. RENEWED JUNE 21, 1909.
929,854.
Patented Aug. 3, 1909.
2 SHEETS—SHEET 2.
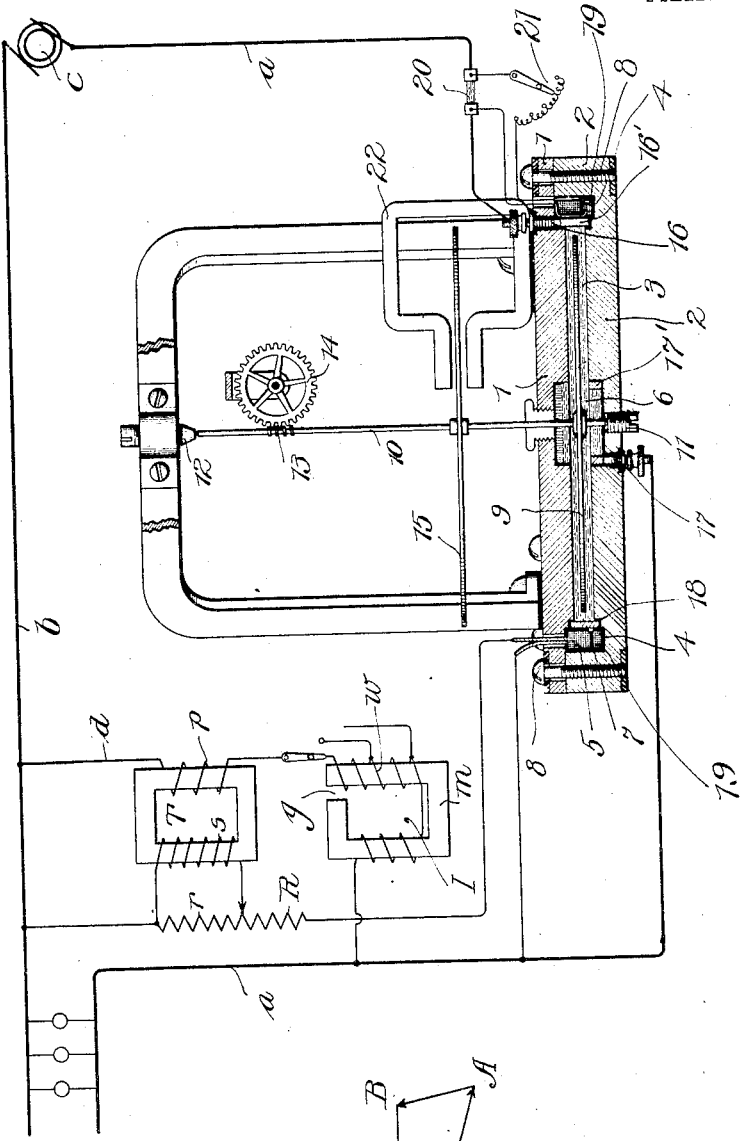
Fig. 3.
Fig. 4.
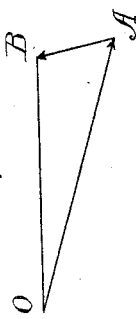
Witnesses:
Leonard W. Novander
Charles J. Schmidt
Inventor
Dugald C. Jackson
By Charles A. Bowen
Attorney

UNITED STATES PATENT OFFICE.

DUGALD C. JACKSON, OF MADISON, WISCONSIN, ASSIGNOR TO DUGALD C. JACKSON AND WILLIAM B. JACKSON, OF MADISON, WISCONSIN, A COPARTNERSHIP.

ELECTRICAL MEASURING INSTRUMENT.

No. 929,854.        Specification of Letters Patent.        Patented Aug. 3, 1909.

Application filed June 5, 1905, Serial No. 263,689. Renewed June 21, 1909. Serial No. 503,425.

*To all whom it may concern:*

Be it known that I, DUGALD C. JACKSON, a citizen of the United States, residing at Madison, in the county of Dane and State of Wisconsin, have invented a certain new and useful Improvement in Electrical Measuring Instruments, of which the following is a full, clear, concise, and exact description, reference being had to the accompanying drawings, forming a part of this specification.

My invention relates to electrical measuring instruments and particularly to an arrangement for phase adjustment for use in connection with electrical instruments intended for alternating current circuits, for instance such as a mercury meter described in my co-pending application, Serial No. 224,370 filed September 14, 1904. For suitable operation of meters of this kind it is necessary to overcome or neutralize the effect of the self inductance of the pressure coil to bring the current in the coil into phase with the pressure in the main circuit. As described in this co-pending application, suitable means for bringing the current in the pressure coil into phase with the main circuit pressure consists in introducing, in effect, an additional electromotive force into the coil circuit of such phase that the resultant pressure causing the current flow is brought into an appropriate position to cause the current flow in the coil to be in phase with the main line pressure. In this co-pending application I have described the general principle and illustrated it by a diagram, and have also explained certain specific arrangements where a condenser is used to give the effect of introducing the special pressure. In the present application, however, I illustrate and describe a transformer arrangement for accomplishing the proper phase adjustment. This phase adjusting means of my invention consists of a transformer having its secondary winding connected in bridge of the whole or part of a resistance included serially in the circuit of the pressure coil of the meter, the primary winding of the transformer being included in a circuit connected in bridge of the main line limbs and including the winding of a self inductive device which has an open magnetic circuit. The self inductance of the inductive device causes a large lag of the current in the primary winding of the transformer with a corresponding position of the electromotive force induced in the secondary coil, and the secondary pressure is impressed across an appropriate part of the resistance in the pressure coil circuit so that the effective pressure in the circuit of the pressure coil comes into such position that the current in the pressure coil flows in phase with the main line pressure.

My invention will be best understood with reference to the accompanying drawing, in which—

Figure 2:
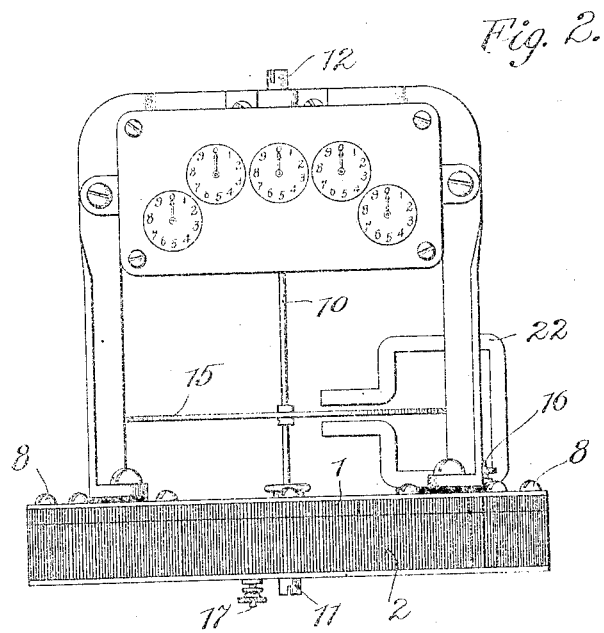

Figure 1 is a plan view of a meter. Fig. 2 is an elevation view thereof. Fig. 3 is an elevation view of a meter in which my invention is employed, parts being shown in section, and Fig. 4 is a diagrammatic illustration of the phase adjusting results.

The construction of the meter is the same as that described in the above referred to co-pending application, and consists of two hollow iron disk members 1 and 2 fitting together to form a cylindrical chamber 3, each of these disk members being slotted to form an annular chamber 4 for receiving the pressure winding 5. The chamber 3 is filled with mercury 6 and a suitable filling 7 is disposed so as to prevent contact of the mercury with the pressure coil or its escape from the containing chamber. The parts 1 and 2 are connected together by bolts or screws 8. The armature disk 9 is of amalgamated copper mounted on a spindle 10, which spindle is pivoted at its lower end in an adjustable screw 11 passing through the lower half 2, and the upper end of the spindle engages an adjustable pivot screw 12, a worm 13 on the spindle engaging with gearing mechanism 14 of a recording train in a manner well known in the art. The armature disk is entirely immersed in the mercury, and the weight of the spindle and the retarding disk 15 mounted thereon is sufficient to counteract the buoyant effect of the mercury. One of the external circuit electrodes 16 passes through the upper plate 1 near the periphery of the armature disk where it may expand into an amalgamated copper band 16′ surrounding the periphery of the disk. The other electrode 17 of the external circuit passes through the lower half 2, its amalgamated end approaching the meter disk near its axis and this electrode may also terminate in a copper band 17′ disposed concentrically about the spindle below the disk. Both the electrodes are in contact with the mercury but insulated from the iron case as shown. The electrode ring 16' rests in annular grooves 18 and against the insulating filling 7 that protects the pressure coil.

The pressure coil 5 surrounding the periphery of the meter disk is connected across the conductors $a$ and $b$ of the external circuit fed from a source of current $c$. This pressure coil upon energization will set up a magnetic field which passes transversely through the mercury chamber and armature disk, and the current of the main circuit will flow from the one electrode to the other radially through the disk. The combined effect of this transverse magnetic field and radial current is to set up a rotative torque on the disk which is proportional to the product of pressure and current (watts) in the main circuit. For properly controlling the rotation of the disk the retarding disk 15 is spanned by the damping magnet 22.

To accomplish proper operation of the meter it is necessary that the current through the pressure coil be in phase with the pressure in the main circuit. This condition, however, is not normally present when the meter is associated with an alternating current circuit, and, broadly, to establish this condition auxiliary means must be employed which in effect will introduce an additional electromotive force into the pressure coil circuit of such phase that the resultant pressure causing the current flow is brought into an appropriate position so as to bring the current flow in phase with the main line pressure. Diagrammatically this is illustrated in Fig. 4 in which the line O, B represents the phase of the main circuit pressure. Line O, A represents the phase of the current in the pressure coil which would normally exist, and line A, B represents the phase relation of the auxiliary means which may be introduced in order that the resultant pressure causing the current flow in the coil be brought into appropriate position to cause the current flow through the pressure to be in phase with the main line pressure.

The auxiliary phase adjusting means consists of transformer and inductance mechanism associated with the pressure coil circuit. The pressure coil circuit includes a high resistance R for regulating the current flow therethrough, and about a suitable part $r$ of this resistance is bridged the secondary winding $s$ of the transformer T. The primary winding $p$ of this transformer is included in the circuit $d$ connected between the main limbs $a$ and $b$ and including the winding $w$ of the self inductance device I. The magnetic circuit $m$ for this winding $w$ is open at the gap $g$. The self inductance of this inductive device causes a large lag of the current in the primary winding of the transformer with a corresponding position of the electromotive force induced in the secondary coil. The secondary pressure is impressed on the resistance R and the effect is to introduce additional electromotive force into the pressure coil circuit of such phase that the current flow through the coil is in phase with the main line pressure. In other words, referring to the diagram in Fig. 4, the phase relation caused by the transformer adjusting mechanism and represented by line A, B so modifies the phase relation of the coil alone, as represented by line O, A, as to cause the current flow through the pressure coil to be in phase with the main line pressure. To extend the operation of this phase adjusting mechanism over a wider range of frequencies the mechanism may be adjustably arranged as shown so that the part $r$ of the resistance bridged about the secondary winding of the transformer may be varied and also that the number of turns of the winding $w$ included in circuit may be varied. To overcome the frictional effect of the mercury, the registering train and other parts of the meter, compensating means may be employed, here shown in the form of a compensating coil 19. This compensating coil may have a proper number of ampere turns of fine wire connected across the terminals of a shunt 20 included serially in the main limb $a$. By means of the adjustable resistance 21 the current through this compensating coil may be adjusted. I thus provide a very simple and efficient means for establishing the proper phase relation between the current flowing through the pressure coil and the main circuit pressure, which means is adjustable over a wide range of operation. I do not wish to be limited to the adaptation of this adjusting means to a mercury meter as herein shown as this manner of adjusting phase relations may be employed with equal facility and advantage to many other electrical instruments or devices intended for operation on alternating current circuits.

Having thus described my invention, I claim as new and desire to secure by Letters Patent:

1. The combination with an alternating current main line circuit, of an electrical measuring instrument, a movable element for said instrument, the main current flow of the circuit being associated directly and serially with said movable element, a pressure field coil for said movable element connected directly in bridge of the main line limbs, and electromagnetic means associated with the circuit of said pressure coil whereby the current through said coil is caused to be in phase with the pressure of the main line circuit.

2. The combination with an alternating current main line circuit, of a measuring instrument associated therewith, a movable element for said measuring instrument, a series path through said movable element included in a main line limb, a pressure field coil for said movable element connected in bridge of the line limbs, a transformer associated with the circuit through said pressure coil, and inductance means coöperating with said transformer to modify the current flow through said pressure coil to bring said current into phase with the main line pressure.

3. The combination with an alternating current main line circuit, of an electrical measuring instrument associated therewith, a movable element for said instrument, a series field for said movable element, a pressure winding for said movable element connected in bridge of the main line limbs, a resistance in the pressure winding circuit, a transformer having a secondary winding bridged about part of said resistance, the primary winding of said transformer being connected in bridge of the main line limbs, and self inductance included in the transformer primary circuit.

4. The combination with an alternating current main line circuit, of an electrical measuring instrument associated therewith, a movable element for said instrument, a series field for said movable element connected serially in the main line circuit, a pressure winding for said instrument connected in bridge of the main line limbs, a resistance in said pressure winding circuit, a transformer having one winding associated with part of said resistance, the other winding of said transformer being connected in bridge of the main line limbs, and means for varying the inductance of the circuit including the other transformer circuit.

5. The combination with an alternating current main line circuit, of a meter associated therewith, a movable element for said meter, a series field for said movable element, a pressure field winding associated with said movable element and connected in bridge of the main line limbs, a resistance in the pressure winding circuit, a transformer having a secondary winding adapted for connection in bridge of part of said resistance, the circuit of said transformer being connected in bridge of the main line limbs, and an inductance device included in the primary circuit for varying the amount of self induction in said circuit, said transformer and inductance device coöperating to modify the current through the pressure coil whereby said current is in phase with the main line pressure.

6. The combination with an alternating current main line circuit, of a meter associated therewith, a movable element for said meter, a series field circuit for said meter included serially in the main line circuit, a pressure field winding associated with said movable element and connected in bridge of the main line limbs, a resistance in said pressure winding circuit, a transformer having a secondary winding adapted for connection across any part of said resistance, the primary circuit of said transformer being connected in bridge of the main line limbs, a self induction coil included in said primary circuit, and means for va g the self induction of said coil, said transformer and coil coöperating to cause the current flow through said pressure winding to be in phase with the pressure of the main line circuit.

7. The combination with an alternating current main line circuit, of a meter associated therewith, a movable element for said meter, a series field path through said meter associated with said movable element, a pressure field winding associated with said movable element and connected in bridge of the main line limbs, and an auxiliary phase modifying circuit inductively associated with the pressure winding circuit to cause the current flow through the pressure winding to be in phase with the main circuit winding.

8. The combination with an alternating current main line circuit, of a meter associated therewith, a movable element for said meter, a series field path through said meter associated with said movable element, a pressure field winding associated with said movable element and connected in bridge of the main line limbs, an auxiliary phase modifying circuit inductively associated with the pressure winding circuit to cause the current flow through the pressure winding to be in phase with the main circuit winding, said phase modifying circuit including inductance, and means for varying said inductance.

9. The combination with an alternating current main line circuit, of a meter associated therewith, a movable element for said meter, a series field path for said meter, a pressure field winding for said meter connected in bridge of the main line limbs, a resistance included in said pressure winding circuit, and a phase modifying circuit inductively associated with said resistance for causing the current through said pressure winding to be in phase with the main line pressure, said phase modifying circuit being connected in bridge of the main line limbs and containing self inductance.

10. The combination with an alternating current main line circuit, of a mercury meter associated therewith, a movable element for said meter, said movable element being included serially in a limb of said main line circuit, a pressure winding for said meter connected in bridge of the main line limbs, and a phase modifying circuit inductively associated with the pressure winding circuit for causing the current through the pressure winding to be in phase with the main line pressure, said phase modifying circuit being connected in bridge of the main line limbs and including variable self induction.

11. The combination with an alternating current main line circuit, of a mercury meter associated therewith, a movable element for said meter, a field frame for said meter shaped to form a mercury chamber for said movable element, said movable element being included serially in one limb of said main line circuit, a pressure field winding for said field frame connected in bridge of the main line limbs, a resistance in the pressure winding circuit, and a phase modifying circuit inductively associated with said resistance for causing the current flow through said pressure winding to be in phase with the main line pressure, said phase modifying circuit being connected in bridge of the main line limbs and containing self inductance.

12. The combination with an alternating current main line circuit, of a mercury meter associated therewith, a movable element for said meter, a field frame forming a mercury chamber for said movable element, said movable element being included serially in one limb of the main line circuit, a pressure field winding for energizing said field frame and connected in bridge of the main line limbs, a resistance in the pressure winding circuit, a transformer having a secondary winding adapted for connection in bridge of any part of said resistance, the primary circuit for said transformer being connected in bridge of the main line limbs, and means for introducing variable amounts of self inductance into said primary circuit.

13. The combination with an alternating current main line circuit, of a mercury meter associated therewith, a movable element for said meter in the form of a disk, a field frame forming a mercury chamber for said movable element, the current flow through said main line circuit being caused to flow through said movable element between the center and the periphery thereof, a pressure field winding for causing magnetic flow transversely through said movable element and connected in bridge of the main line limbs, a resistance in said circuit, a transformer having a secondary winding connected in bridge of part of said resistance, the primary circuit of said transformer being connected in bridge of the main line limbs, and means for introducing variable amounts of self inductance into said primary circuit.

In witness whereof, I hereunto subscribe my name this second day of June A. D., 1905.

DUGALD C. JACKSON.

Witnesses:
WM. B. JACKSON,
DORA E. CASEY.